May 20, 1941. J. W. HOEFLING ET AL 2,242,302

COTTONSEED DELINTER

Filed Jan. 15, 1940

INVENTORS
J. W. Hoefling
P. M. Hoefling
BY
Webster & Webster
ATTORNEYS

Patented May 20, 1941

2,242,302

UNITED STATES PATENT OFFICE 2,242,302

COTTONSEED DELINTER

John W. Hoefling and Philip M. Hoefling, Sacramento, Calif., assignors to Hoefling Brothers, Sacramento, Calif., a copartnership Application January 15, 1940, Serial No. 313,883

9 Claims. (Cl. 19—42)

This invention relates generally to the art of removing lint from cotton seed or the like which has been previously ginned, and in particular the invention is directed to an improved cotton seed delinting apparatus.

Cotton fibers grow attached to the cotton seed much the same as hair on a scalp; the initially long fibers completely enclosing the seed. After passage of such seeds through a conventional cotton gin, the major portion of the fibers are cut or torn from the seeds, but a pronounced stubble or fuzz remains on the seed. If this stubble or fuzz, known as lint, is left on the seed, such lint seed tends to clot or bunch up making it very bulky and difficult to handle especially when planting the same. Further, the lint remaining on the seed has a definite commercial value, and if not recovered represents a substantial economic loss.

We are aware that previous attempts have been made to successfully delint cotton seed, but to date such attempts have not been of commercial practicability. For example, modified types of gins have been developed which will recover a part of the lint but not all, thereby falling short of the desired goal. Acid delinting of seed used for planting has been resorted to but is a very expensive process and the lint is lost.

Several factors conspire to make the problem more acute than is first apparent. Linters removed from the seed must be immediately separated from the mass of seed in the apparatus else the clotting or bunching action is aggravated and tends to build up an insulating effect about the seed against further delinting action. In addition, the seed being of irregular configuration is vulnerable to rough handling. Any over delinting action, or action too severe, sharp, or unyielding, indulged in to attempt to separate the firmly rooted lint from the seeds, results in particles of the black hull—known as "pepper"—being chipped off and going into the linters. This, of course, is to be avoided as it impairs the value of the linters.

It is therefore the principal object of our invention to provide a cotton seed delinter which—in commercial installation—will effectively remove and separate all the lint from cotton seed and with a minimum of contamination of the linters with the so-called "pepper."

Another object of the invention is to provide delinting apparatus, of the type described, in which the delinting medium comprises a housed rotary brush; the bristles of the brush being relatively long and of flexible and resilient steel wire whereby to produce an effective and yet yielding or non-severe delinting action on the seeds.

A further object of the invention is to provide a unique arrangement for introducing to and discharging from the delinting zone the air current required to carry off the linters from said zone.

It is also an object of the invention to provide a delinter which includes in unitary combination, a seed delinting medium, a fan, and a linters collector; said elements being arranged in such relation that the air current from the fan flows in a closed circuit through the delinting medium and linters collector and thence returns to said fan.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawing similar characters of reference indicate corresponding parts in the several views.

Figure 1:
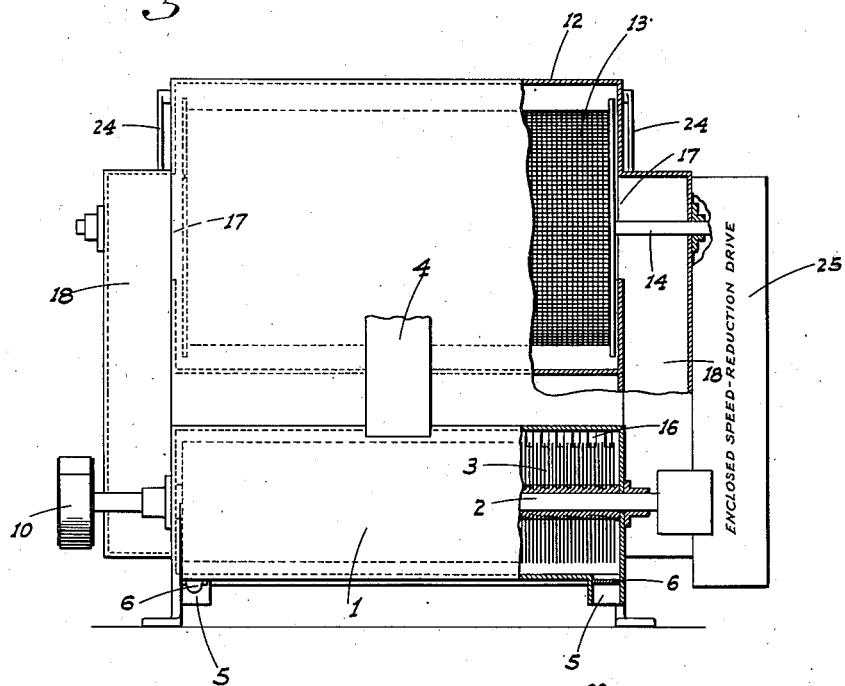
Figure 1 is a front elevation, partly broken away, of the apparatus.
Figure 2:
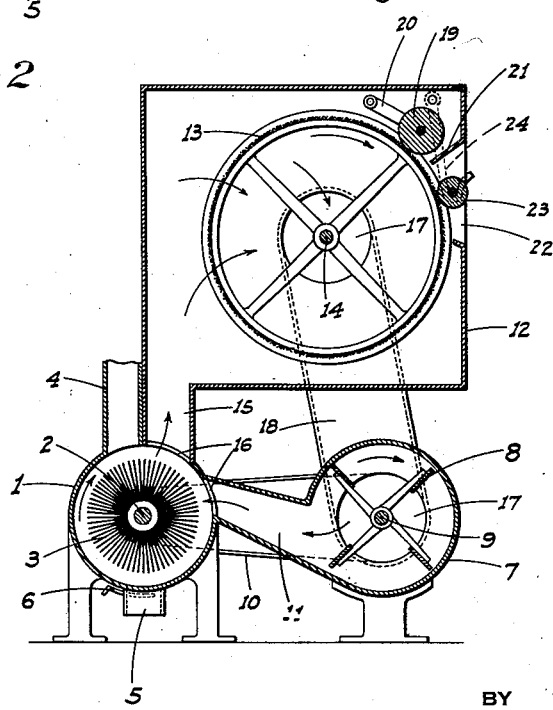
Figure 2 is a cross section of the apparatus.

Referring now more particularly to the characters of reference on the drawing, the apparatus comprises a cylindrical casing or housing 1 of substantial length and horizontally disposed. A shaft 2 driven in any suitable manner extends axially through housing 1 and carries a full length, high speed rotary brush 3 which rotates in the direction indicated by the arrow, such brush having a small diameter hub and relatively long, steel bristles which are flexible and resilient. The outer ends of these bristles terminate short of the inner surface of the housing as shown.

An upstanding feed or intake passage 4 is mounted on housing 1 centrally of its ends and offset somewhat forwardly relative to the axis of rotary brush 3. The housing 1 at the bottom and at its ends is formed with outlet or discharge openings 5, each of which is provided with manually adjustable gates 6 normally open somewhat.

A horizontally disposed, cylindrical fan housing 7 is mounted rearwardly of housing 1 and parallel thereto; this fan housing 7 being the same length as housing 1. An air impeller or fan 8 extends within housing 7 from end to end thereof, and is carried on a shaft 9 which is driven at a somewhat reduced speed from shaft 2 by means of a belt drive 10.

An air passage or duct 11 communicates between fan housing 7 and brush housing 1; such duct 11 being full width relative to said housings. This duct enters housing 1 at such point that the air from the fan enters said housing substantially tangentially of the rotary brush and flows in a direction counter to the direction of rotation of the brush.

Another relatively large housing 12, likewise equal in length to housings 1 and 7, and rectangular in cross section, is disposed above said housings. A slow speed rotary screen drum or linters collecting reel 13 is disposed in housing 12 on a horizontal shaft 14. A full length air passage 15 connects between the top of housing 1 immediately rearwardly of feed passage 4, and the bottom of housing 12 adjacent the front thereof. Grills or grates 16 are formed with housing 1 at the adjacent ends of duct 11 and passage 15 whereby to allow free flow of air therethrough but retention of the seeds in said housing 1. Housings 7 and 12 are each formed at both ends with ports 17, and corresponding ports of said housings are arranged in communication by means of ducts 18 extending therebetween.

As is conventional, a linters compressing roller 19 supported by pivoted arms 20 rests on reel 13 adjacent the top thereof and adjacent the back of housing 12. Immediately below roller 19, the housing is formed with a horizontal baffle 21 projecting inwardly toward reel 13; such housing having a horizontal opening 22 below said baffle. A removable batting collecting spool is disposed in opening 22, and is carried at its ends by swing arms 24. The shaft 14 for reel 13 is driven at very slow variable speed of from 1 to 4 R. P. M., from shaft 9 by means of any siutable speed reduction drive which is enclosed in a case 25.

In operation the lint bearing seed is introduced by gravity into the apparatus through feed passage 4 whence it spreads over the high speed rotary brush 3 filling the space between the ends of the brush bristles and cylindrical housing 1. This spreading is due to the fact that the central portion of the housing or chamber soon fills up and the seed, being continually introduced, "spills over" this filled portion and consequently also ultimately fills the chamber beyond the intake. This action is also aided by the fact that the outlets 5 at the ends of the chamber are always open, and some of the air blast flowing through the chamber escapes through said outlets, thus tending to carry the seed from the center of the chamber toward the ends thereof. This mass of seed naturally tends to begin to revolve rapidly with the rough brush within the smooth housing. However, upon meeting the blast of air coming from passage or duct 11 and at substantial tangency to the line of travel of the mass, the same is slowed down to slight movement circumferentially but takes on increasing rolling movement. This provides continuously changing points of contact between the seed and the rotary brush, and in addition the entering air blast also has the effect of thoroughly loosening up the mass of seed at every lap of its circumferential travel. Further, the tangential application of the air blast from duct 11 effects an instantaneous elimination of all cut linters from the delinting zone. The reason for this is that as the linters are cut from the seed by the high speed rotary brush, such linters adhere temporarily as a film to the cutting points or outer ends of the bristles of the rotary brush. Due to the relative position of the brush, and because of the adaptability of the brush to such function, the air blast penetrates into the rotary brush itself and comes up from beneath this film of linters carrying them off completely and quickly into air outlet passage 15 and with a minimum of contact with seed in the path of air flow. Mere polishing of the seed takes place after the lint is removed.

The linter laden air flowing through passage 15 enters housing 12 and the linters are deposited on rotating screen reel 13. The linters closely accumulate on such slowly moving reel and are firmly compressed by roller 19 into a layer or batting which automatically transfers and winds itself onto the removable spool 23. The batting is initially started or wound on the spool by hand, and thereafter frictional engagement with reel 13 continues to rotate such spool. When the spool is wound to capacity it is removed and replaced by an empty spool.

The current of air after depositing the linters upon the reel 13, passes through the screen surface thereof into drum 13, out the ends of said drum into ducts 18 and thence flows back to the suction ends of fan housing 7, thus completing the closed circuit of the air current or circulation through the apparatus. By reason of such closed circuit the machine is very clean in operation, as any linters which may pass through the screen reel 13 are not discharged into the atmosphere and lost, but rather return to the fan and thence pass back into the delinting housing 1. In addition the closed circuit arrangement provides a simple, compact, and complete unit requiring a minimum of floor space and operating on a reasonable amount of power.

Control of the degree or extent of delinting is accomplished through adjustment of the gates 6 on the discharge outlets 5 at the bottom and ends of housing 1. These gates are kept closed at the start and until the desired stage of delinting is reached, and are then adjusted to bleed out the delinted seed at a rate of flow providing the desired results. The lint seed entering housing 1 through feed passage 4 by gravity keeps the apparatus loaded to capacity by automatic replacement of the volume shrinkage as lint is removed and finished seed bled out. The arrangement of the feed passage at midsection of the housing 1 with outlets 5 at the bottom and ends of housing 1 is preferable due to the better operating balance obtained. The only other operating control required is control of the velocity of air in circulation in the apparatus, and this is accomplished through speed determination of the fan to suit given operating conditions.

The herein described cotton seed delinting apparatus is designed to continue on a commercially practical basis, the delinting of the seed from the point where the ordinary cotton gin cannot remove further lint and to effect delinting of the seed without injury thereto and with minimum contamination of the cut linters. It is obvious that our apparatus may be used either after the first ginning operation, or after an initial delinting operation, to completely delint the seed and at the same time to recover the linters. Delinting in stages of two or three cuts may be desirable as the value of first cut linters is higher than full cut linters.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. In a seed delinter, an enclosed cylindrical housing, a driven rotary brush disposed in said housing, said brush having radially extending, flexible and resilient bristles of substantial length, means to feed lint seed into said housing at a point in the circumference thereof, a fan arranged to discharge air into said housing from another point in the circumference thereof and in a plane substantially tangentially of said brush, the direction of air flow being counter to the direction of rotation of the brush, an air and lint outlet passage leading from the circumference of the housing between said points adjacent the point of tangency of the air flow with the brush, and a seed outlet from the housing relatively remote from the air and lint outlet passage.

2. In a seed delinter, an enclosed cylindrical housing, a driven rotary brush disposed in said housing, said brush having radially extending, flexible and resilient bristles of substantial length, the outer ends of the bristles terminating short of the interior of the housing, a pair of longitudinally extending circumferentially spaced grills formed in the housing, and a fan arranged to discharge air through one grill into said housing in a plane substantially tangentially of said brush; the other grill being disposed adjacent the point of tangency of the air flow with the brush.

3. In a seed delinter, an enclosed cylindrical housing, a driven rotary brush disposed in said housing, said brush having radially extending, flexible and resilient bristles of substantial length, the outer ends of the bristles terminating short of the interior of the housing, a pair of longitudinally extending circumferentially spaced grills formed in the housing, and a fan arranged to discharge air through one grill into said housing in a plane substantially tangentially of said brush and in a direction counter to the direction of rotation of the brush; the other grill being disposed adjacent the point of tangency of the air flow with the brush.

4. In a seed delinter, the combination of an enclosed delinting unit, an enclosed linter recovery unit, and an enclosed fan unit, said units being arranged in communication to provide a closed air circuit; the fan unit outlet delivering to the delinting unit, the delinting unit delivering to the linter recovery unit, and the linter recovery unit delivering to the fan unit intake.

5. In a seed delinter, the combination of an enclosed seed delinting unit, an enclosed linter recovery unit, an enclosed fan unit, an air feed conduit connecting the fan outlet unit and the delinting unit, a separate air and linters conduit connecting the delinting unit and the linter recovery unit, and a separate return air conduit connecting the linter recovery unit and the fan unit intake.

6. In combination, an enclosed seed delinting unit having separate air inlet and outlet ports, an enclosed fan arranged with its outlet in communication with said inlet port, an enclosed linter recovery unit arranged in communication with said outlet port and operative to separate substantially all the linters from a stream of linter carrying air flowing from said delinting unit, and means to return the substantially linter free air from said recovery unit to the intake of the fan.

7. In combination, a cylindrical housing having a pair of circumferentially spaced, longitudinally extending grilled openings therein, a rotary brush mounted in said housing, the brush being of less diameter than the internal diameter of said housing, an enclosed fan, a conduit connected between the fan outlet and one of said grilled openings, another housing, a driven linter recovery reel mounted in said other housing, a conduit connected between the other grilled opening and said other housing, and a return air conduit from the interior of the reel to the intake of the fan.

8. In a seed delinter, an enclosed cylindrical housing, a driven rotary brush disposed in said housing, said brush having radially extending flexible and resilient bristles of substantial length, means to feed lint seed into the housing, a fan arranged to discharge its entire volume of air into the housing and the major portion of said volume through the brush in a plane adjacent and parallel to a line substantially tangent to the periphery of said brush, and counter to the direction of rotation thereof, a separate air and lint outlet passage leading solely from the housing and disposed adjacent said point of tangency, and a seed outlet from the housing at a point spaced from said air outlet passage.

9. In a seed delinter, an enclosed cylindrical housing, a driven rotary brush having resilient bristles mounted in the housing with the bristles spaced from the inner surface of said housing, means to feed lint seed into the housing, a fan, and a duct leading from the fan into the housing and connected thereto in position to discharge its entire volume of air into the housing and the major portion of said volume through the brush in a plane adjacent and parallel to a line substantially tangent to the periphery of said brush.

JOHN W. HOEFLING.
PHILIP M. HOEFLING.